United States Patent Office 2,708,209
Patented May 10, 1955

2,708,209

PROCESS FOR SELECTIVE CRYSTALLIZATION OF 2,5-DICHLOROPHENOL

Bernard H. Nicolaisen and Theodore M. Jenney, Kenmore, N. Y., assignors to Olin Mathieson Chemical Corporation, a corporation of Virginia No Drawing. Application October 29, 1953, Serial No. 389,163

3 Claims. (Cl. 260—623)

Our invention relates to the production of 2,5-dichlorophenol from mixtures of isomers of dichlorophenol.

Dichlorophenols may be produced by the chlorination of phenol but the chlorination yields largely 2,4-dichlorophenol and therefore is not a satisfactory source of 2,5-dichlorophenol. In the hydrolysis of chlorobenzenes to produce dichlorophenols, mixtures of isomeric dichlorophenols are produced from which it is difficult to separate 2,5-dichlorophenol. The mixtures of isomers of dichlorophenol are produced when a mixture of isomers of trichlorobenzene is used or may even be produced when 1,2,4-trichlorobenzene is used. Effective separation of 1,2,4-trichlorobenzene from the 1,2,3-isomer, which is usually associated with it in mixtures of isomeric trichlorobenzenes, is expensive and difficult due to the small difference in boiling points of the two isomers. Moreover, separation of the isomeric trichlorobenzenes does not remove the possibility of the formation of mixtures of isomeric dichlorophenols since each of the isomers, even though pure, may give rise to a plurality of dichlorophenols. 2,5-dichlorophenol is a useful material which has particular utility in the manufacture of resins. Moreover, chlorination of 2,5-dichlorophenol converts it to 2,4,5-trichlorophenol of unusually high purity.

We have found that 2,5-dichlorophenol surprisingly is produced in good yields and in a substantially enriched fraction, i, e., containing as much as 95 percent or more 2,5-dichlorophenol, by crystallization from a mixture of isomers of dichlorophenol containing at least about 50 per cent of 2,5-dichlorophenol, with 2,3-, 2,4- and 2,6-dichlorophenols constituting the other principal components. This is surprising as 2,6-dichlorophenol has a higher melting point than 2,5-dichlorophenol (2,6-dichlorophenol has a melting point of 66 to 68° C., 2,4-dichlorophenol 56 to 58° C. and 2,5-dichlorophenol 58–59° C.). According to our invention a mixture of isomers of dichlorophenol containing at least about 50 per cent of 2,5-dichlorophenol, along with 2,3-, 2,4- and 2,6-dichlorophenols, is cooled to a temperature of about 0 to 5° C. and a solid fraction substantially enriched in 2,5-dichlorophenol is separated. The mixture is cooled until about one-third to one-half of the mixture separates as a solid phase which is then freed from the mother liquor, for example, by centrifuging. The 2,5-dichlorophenol is recovered in good yields and as a solid fraction containing as high as about 95 per cent or more, usually about 98 to 99 per cent, of 2,5-dichlorophenol. Thus, our invention provides a simplified and effective process for producing 2,5-dichlorophenol in good yields and in substantially pure form from mixtures of isomers of dichlorophenol. The process is particularly advantageous in that the 2,5-dichlorophenol can be recovered from a mixture of isomers of dichlorophenol prepared by the hydrolysis of mixtures of isomers of trichlorobenzene, comprising the 1,2,3-and 1,2,4-isomers, thereby eliminating difficult and expensive separation of 1,2,4-trichlorobenzene from the mixture.

The mixtures of isomers of dichlorophenol useful in our invention advantageously are obtained by the hydrolysis of trichlorobenzene. The trichlorobenzenes useful for hydrolysis may be obtained by the chlorination of benzene, chlorobenzenes or dichlorobenzene. Advantageously, however, benzene hexachloride is dehydrochlorinated thermally or catalytically, for example with ferric chloride, to produce a mixture of isomers of trichlorobenzene. A particularly advantageous source of benzene hexachloride is the insecticidally inactive benzene hexachloride isomers, particularly the alpha and beta isomers, produced by the separation of the insecticidally active gamma isomer from crude benzene hexachloride. This material is of limited usefulness and thereby furnishes an advantageous starting material. The mixture produced by the dehydrochlorination of the waste benzene hexachloride isomers, usually comprising about 90 per cent of the alpha isomer and 10 per cent of the beta isomer, usually comprise about 70 to 75 per cent of 1,2,4-trichlorobenzene, about 25 per cent of 1,2,3-trichlorobenzene, about 3.5 per cent of 1,2,4,5-tetrachlorobenzene and about 2.5 per cent of 1,2,3,4-tetrachlorobenzene. In the dehydrochlorination of benzene hexachloride, chlorine may be used as a dehydrochlorinating agent in small amounts, i. e. in amounts equal to about 0.1 to 10 grams per minute per kilogram of benzene hexachloride, in a liquid phase operation conducted at a temperature of about 110° C. to 250° C. to produce a mixture comprising about 65 to 70 per cent of 1,2,4-trichlorobenzene, about 25 per cent of 1,2,3-trichlorobenzene and about 6 per cent of isomeric tetrachlorobenzenes. With other dehydrochlorinating agents, for example ferric chloride, tetrachlorobenzenes are usually absent but the ratio of the 1,2,4- and 1,2,3-trichlorobenzene is substantially unchanged.

Advantageously, the crude mixture of isomeric trichlorobenzenes is distilled to increase the concentration of 1,2,4-trichlorobenzene in the mixture, although the crude mixtures also may be used as such. The difficult and expensive separation of the 1,2,4-isomer by distillation is not necessary, however. Distillation of the mixture of isomers of trichlorobenzene with a relatively few plates is advantageous and a product comprising about 70 to 77 per cent of 1,2,4-trichlorobenzene and 22 per cent of 1,2,3-trichlorobenzene is thus easily obtained.

The hydrolysis of the mixture of isomers of trichlorobenzene is carried out, for example, using caustic, with alcohols or glycols as reaction media at elevated temperatures. A hydrolysis product containing about 60 per cent of 2,5-dichlorophenol, 14 per cent of 2,3-dichlorophenol, 8 per cent of 2,6-dichlorophenol and 17 per cent of 2,4-dichlorophenol is thus obtained from a trichlorobenzene mixture containing about 77 per cent of 1,2,4-trichlorobenzene.

The mixture of isomers of dichlorophenol is then cooled to separate solid 2,5-dichlorophenol. The preferred temperature to which the mixture of isomers of dichlorophenol are cooled in order to obtain a substantially pure 2,5-isomer as a solid is about 0 to 5° C. At temperatures as low as —5° C., the eutectic mixture of 2,5- and 2,6-dichlorophenol separates and contaminates the solid product. The mixture is cooled until from about one third to one half of the mixture separates as a solid phase. Freed from adhering mother liquor, for example, by centrifuging, the solid comprises about 95 per cent or more, usually about 98 to 99 per cent, of 2,5-dichlorophenol with less than 1 per cent of each of 2,3-, 2,4- and 2,6-dichlorophenols. When a 60 per cent 2,5-dichlorophenol mixture is crystallized at least about 75 per cent of that component is recoverable as a solid phase from the mixture. The remaining mother liquor contains about 25 per cent of 2,5-dichlorophenol and 75 per cent of other isomeric dichlorophenols.

Although, preferably, the mixture of isomers of trichlorobenzene is distilled to increase the proportion of 1,2,4-trichlorobenzene and thereby increase the yield of 2,5-dichlorophenol, crude undistilled mixtures may be utilized. Thus, crude mixtures of isomers of trichlorobenzene from the dehydrochlorination of benzene hexachloride may be hydrolyzed to obtain a product containing about 55 per cent of 2,5-dichlorophenol, 15 per cent of 2,3-dichlorophenol and 10 per cent of 2,6-dichlorophenols with about 15 per cent of 2,4-dichlorophenol and 5 per cent other chlorophenols. For many purposes this crude mixture may be used directly or substantially pure 2,5-dichlorophenol can be recovered from the mixture by crystallization. In this manner, about 50 per cent or more of the 2,5-dichlorophenol content of the mixture is recoverable. Lower yields are obtained than from mixtures richer in the 2,5-dichlorophenol component but the purity of the solid is substantially the same as when it is crystallized from a dichlorophenol mixture containing higher proportions of 2,5-dichlorophenol, for example about 60 per cent.

More effective fractionation of the mixtures of isomers of trichlorobenzene may be carried out to yield a trichlorobenzene composition containing, for example, about 85 to 87 per cent of 1,2,4-trichlorobenzene which on hydrolysis yields a dichlorophenol mixture containing about 70 per cent of 2,5-dichlorophenol, as well as about 10 per cent of 2,3-dichlorophenol, about 5 per cent of 2,6-dichlorophenol and 15 per cent of 2,4-dichlorophenol, which may be used as such or as a source of pure 2,5-dichlorophenol by crystallization.

We claim:

1. A process for the production of 2,5-dichlorophenol which comprises cooling a mixture of isomers of dichlorophenol containing at least about 50 per cent of 2,5-dichlorophenol to a temperature of about 0 to 5° C. until about one-third to one-half of the mixture separates as a solid phase and recovering the solid phase as a solid fraction substantially enriched in 2,5-dichlorophenol.

2. A process for the production of 2,5-dichlorophenol which comprises hydrolyzing a mixture comprising 1,2,3-trichlorobenzene and 1,2,4-trichlorobenzene to produce a mixture of isomers of dichlorophenol containing at least 50 per cent of 2,5-dichlorophenol, cooling the mixture of isomers of dichlorophenol to a temperature of about 0 to 5° C. until about one-third to one-half of the mixture separates as a solid phase and recovering the solid phase as a solid fraction substantially enriched in 2,5-dichlorophenol.

3. The process of claim 2 in which the mixture comprising 1,2,3-trichlorobenzene and 1,2,4-trichlorobenzene is obtained by dehydrochlorinating benzene hexachloride.

No references cited.